United States Patent [19]

Rutty

[11] Patent Number: 4,466,194
[45] Date of Patent: Aug. 21, 1984

[54] TRUE ZERO TAPE HOOK

[75] Inventor: Edward C. Rutty, Portland, Conn.

[73] Assignee: The Stanley Works, New Britain, Conn.

[21] Appl. No.: 414,785

[22] Filed: Sep. 3, 1982

[51] Int. Cl.³ .............................................. G01B 5/02
[52] U.S. Cl. .................................... 33/137 R; 33/173
[58] Field of Search ................. 33/137 R, 137 L, 138, 33/139, 140, 173

[56] References Cited

U.S. PATENT DOCUMENTS

| | | |
|---|---|---|
| 1,066,972 | 7/1913 | Aitken ............................... 33/137 R |
| 1,439,645 | 12/1922 | Sell . |
| 1,623,138 | 4/1927 | Swift . |
| 1,646,826 | 10/1927 | Langsner . |
| 1,723,739 | 8/1929 | Langsner . |
| 1,726,960 | 9/1929 | Langsner . |
| 1,798,476 | 3/1931 | Langsner . |
| 1,860,635 | 5/1932 | Thompson . |
| 2,574,272 | 11/1951 | McCully ........................... 33/137 R |
| 2,770,883 | 11/1956 | Hackney . |
| 2,778,118 | 1/1957 | Manville . |
| 3,601,896 | 8/1971 | Ledene . |
| 3,965,579 | 6/1976 | Woods . |

*Primary Examiner*—William D. Martin, Jr.

[57] ABSTRACT

An end assembly for a tape rule employs a "true zero" hook, which has a hinge portion that is offset from its body portion by a distance equal to the thickness of the material from which the hook is fabricated. The hinge and body portions have outside and inside planar surfaces, respectively, that are perpendicular to one another and are equidistant from the axis of pivoting of the hinge portion about the ring by which it is attached to the tape rule. This permits the device to be utilized for the measurement of outside and inside dimensions, with the hook in its open or closed position, respectively.

5 Claims, 5 Drawing Figures

TRUE ZERO TAPE HOOK

BACKGROUND OF THE INVENTION

Tape rules commonly carry a hook on their free end by which the rule can be fixed over an edge of the piece to be measured. This frees the hand of the individual, enables him to measure long distances without assistance, and ensures the accuracy of the measurement by providing a fixed reference point. Due, however, to its own structure, this type of end assembly introduces an inaccuracy when the rule is used for inside measurements. While it is possible to minimize error by fabricating the parts from very thin materials, this is not a practical solution due to the structural weakness that such construction would entail.

Accordingly, it is a principal object of the present invention to provide a novel end assembly for a tape rule which employs a "true zero" hook, such hook enabling the free end of the rule to be fixed over an edge of the work or butted against an inside surface, providing accurate measurements in either mode of use.

It is a more specific object of the invention to provide such an assembly wherein the body of the hook and the hinge portion thereof provide inside and outside surfaces, respectively, which will lie in the same plane depending upon whether the hook is in its open or closed position relative to the ring by which it is attached to the tape rule.

It is also an object of the invention to provide a novel tape rule device that incorporates the foregoing features and advantages.

A further object of the invention is to provide such an end assembly and device wherein the hook is of simple and inexpensive construction, but is nevertheless strong, rugged and durable.

SUMMARY OF THE INVENTION

It has now been found that certain of the foregoing and related objects of the invention are readily attained in an end assembly for a tape rule, wherein the hook includes a generally planar body portion and an integrally formed hinge portion inwardly offset therefrom. The body portion has a substantially flat inner surface, and the hinge portion has a substantially flat outer surface extending thereacross. The hinge portion comprises a centrally disposed neck element, inwardly curved in a generally cylindrical configuration, and a pair of shoulder elements disposed to either side of the neck element and providing abutment surfaces on the hook. The neck element encircles the end of the rectangular ring opposite to that at which it is attached to the free end of the tape rule, thereby permitting the hook to pivot thereabout between a closed position and an open position. In the closed position, the body portion of the hook abuts the intermediate portion of the ring; in its open position, the body portion extends at a right angle to the plane of the ring, with the abutment surfaces of its shoulder elements bearing upon the ring to restrain movement of the hook beyond a perpendicular relationship thereto. The inner surface of the body portion and the outer surface of the hinge portion are disposed in planes that are perpendicular to one another and are perpendicularly equidistant from the axis of pivoting of the hook. As a result, the inner and outer surfaces will lie in the same imaginary plane, generally perpendicular to the plane of the ring, when the hook is in its open and closed positions, respectively.

Normally, the hook will be integrally formed from a sheet metal material, and the hinge portion thereof will be offset from the body portion a distance that is substantially equal to the metal thickness. Preferably, the hook will additionally include a pair of barbs that extend inwardly from its body portion, the barbs being adapted to penetrate the associated workpiece so as to enhance the security of engagement of the hook thereupon. The end of the body portion opposite to that at which the hinge portion is disposed may have a notch formed into it, defined by side edges that converge to a substantially rectilinear, transversely extending inner edge, with the barbs being formed at the junctures of the edges.

Certain objects of the invention are attained by the provision of a tape rule device comprising a tape rule and an end assembly. The end assembly employed will have the features hereinbefore and hereinafter described.

DETAILED DESCRIPTION OF THE ILLUSTRATED EMBODIMENT

Figure 1:
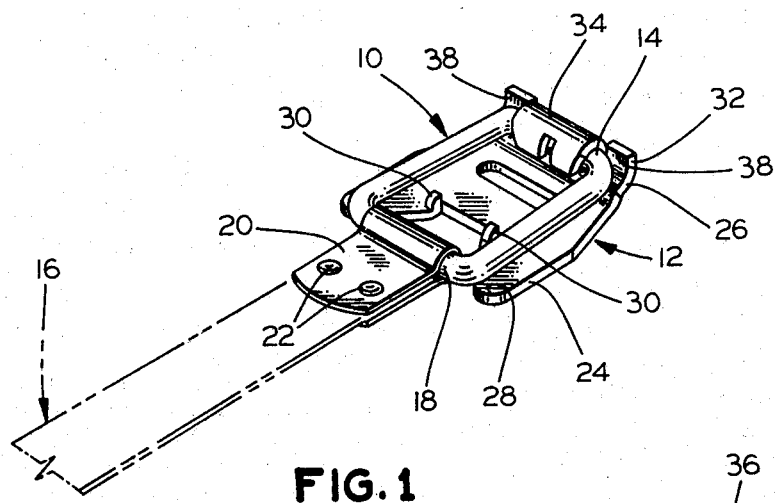
FIG. 1 is a fragmentary perspective view of a device embodying the present invention, with the hook in closed position and with the tape rule shown in phantom line.
Figure 2:
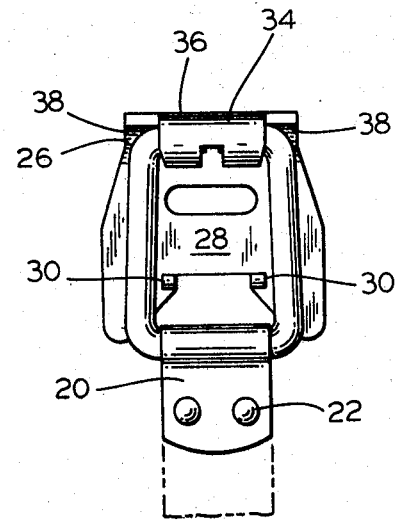
FIG. 2 is a top plan view of the device of the foregoing figure.
Figure 3:
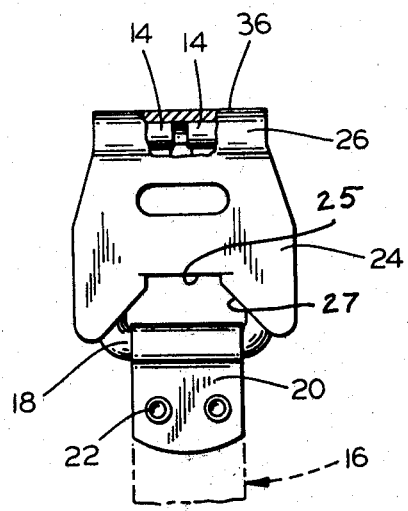
FIG. 3 is a bottom plan view of the device.

Turning now in detail to the appended drawing, therein illustrated is a device embodying the present invention and including a rectangular ring, generally designated by the numeral 10, and a hook, generally designated by the numeral 12, attached thereto. The ring 10 is a length of wire or rod stock bent into a generally C-shaped configuration, providing inwardly directed free end portions 14 upon which the hook 12 is mounted. The tape rule, which is shown in phantom line and is generally designated by the numeral 16, is attached to the opposite end portion 18 of the ring 10 by a metal loop 20, which is formed thereabout and is fixed to the rule 16 by a pair of rivets 22.

The hook itself consists of a planar body portion 24 and an offset hinge portion 26. The body portion 24 has a generally rectangular configuration, but has a notch formed into its free end, defined by a pair of convergent edges 25 which terminate at a rectilinear, transversely extending edge 27. A pair of barbs 30, projecting inwardly from the flat inner surface 28 of the body portion 26, are formed at the junctures of the edges 25 with edge 27.

Figure 5:
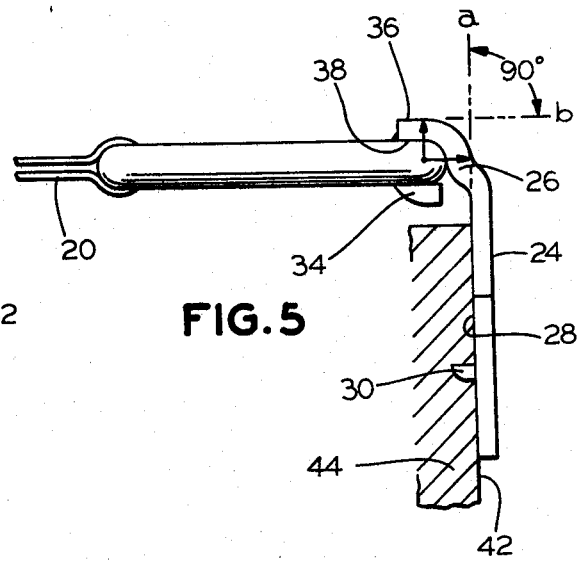
FIG. 5 is a side elevational view of the device of the foregoing Figures drawn to an enlarged scale, the tape rule being removed therefrom and the hook being shown in its open position and engaged over an edge of the workpiece, for making an outside measurement.

The hinge portion of the hook 12 comprises a pair of shoulder elements 32 and a centrally disposed neck element 34, which elements 32, 34 extend at a right angle to the body portion 24 and provide a flat outer surface 36. Abutment surfaces 38 are defined on the underside of the shoulder elements 32; as seen in FIG. 5, they bear upon the ring 10 in the open position of the hook, and restrain its movement beyond a perpendicular relationship. The neck element 34 extends beyond the shoulder elements 32 and is curled to encircle the end portions 14 of the ring 10, thereby forming a generally cylindrical hinge thereabout.

As is most clearly illustrated in FIG. 5, the inner and outer surfaces 28, 36 of the body portion and hinge portion 24, 26, respectively, lie in planes "a" and "b". These planes are perpendicular to one another and are perpendicularly equidistant from the axis of pivoting about the end portions 14, as indicated by the two equal-length arrows shown in the Figure. In the open position shown, the inside surface 28 of the hook 12 bears against an end surface 42 of the workpiece 44, with the barbs 30 embedded therein, thus fixing the tape securely in position and enabling an outside measurement to be accurately made.

Figure 4:
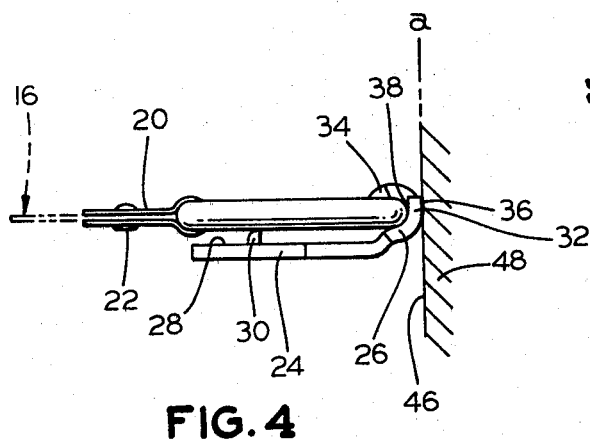
FIG. 4 is a side elevational view illustrating use of the device for inside measurement.

In FIG. 4, the hook 12 is shown in its closed position, for determining inside dimensions. To do so, the ring 10 is placed with the outside surface 36 of the hook 12, which extends across the shoulder and neck elements 32, 34, in a flush position against the interior surface 46 of the workpiece 48. Because the body portion 24 of the hook 12 is offset from the hinge portion 26 a distance equal to the thickness of the material from which it is fabricated, and because the surfaces 28, 36 are perpendicular to one another, it will readily be appreciated that they will lie in the same plane in their respective operative positions, i.e., when the hook is in its open and closed positions, respectively. Thus, by taking into account the thickness of the hook, the device enables a true zero measurement to be taken regardless of the mode of use.

The materials of construction and the manner of manufacture of the assembly and device of the invention are conventional, and will be readily evident to those skilled in the art. Normally, of course, all parts will be made of metal, but other materials might be substituted in appropriate circumstances, if so desired. While the particular configuration of the hook illustrated is regarded to be optimal, it will also be understood that changes can be made without departure from the concepts of the invention and the scope of the claims hereof.

Thus, it can be seen that the present invention provides a novel end assembly for a tape rule which employs a "true zero" hook, such hook enabling the free end of the rule to be fixed over an edge of the work or butted against an inside surface, providing accurate measurements in either mode of use. The body of the hook and the hinge portion thereof provide inside and outside surfaces, respectively, which will lie in the same plane, depending upon whether the hook is in its open or closed position relative to the ring by which it is attached to the tape rule. The invention also provides a novel tape rule device that incorporates the foregoing features and advantages; the hook employed is of simple and inexpensive construction, and is nevertheless strong, rugged and durable.

Having thus described the invention, what is claimed is:

1. An end assembly for a tape rule, comprising: a generally rectangular ring having one end adapted for attachment to the free end of a tape rule; and a hook, integrally formed from a single piece of material of uniform thickness, including a generally planar body portion having a substantially flat inner surface, and a hinge portion at one end thereof pivotably attached to the other end of said ring, said hinge portion being offset from said body portion a distance substantially equal to the thickness of said hook material and having a substantially flat outer surface extending thereacross, and comprising a centrally disposed neck element inwardly curved to a generally cylindrical configuration, and a pair of shoulder elements disposed to either side of said neck element and providing abutment surfaces on said hook, said neck element encircling said other end of said ring to permit said hook to pivot thereabout between a closed position wherein said body portion abuts the intermediate portion of said ring, and an open position wherein said body portion extends at a right angle to the plane thereof, said abutment surfaces of said shoulder elements bearing upon said ring in said open position to restrain movement of said hook beyond a perpendicular relationship thereto, and said inner surface of said body portion and said outer surface of said hinge portion being disposed in planes that are perpendicular to one another and perpendicularly equidistant from the axis of pivoting of said hook about said other end of said ring, whereby said inner surface and said outer surface will lie in the same imaginary plane, generally perpendicular to the plane of said ring, when said hook is in said open and closed positions thereof, respectively.

2. The assembly of claim 1 wherein said hook is an integrally formed sheet metal member.

3. The assembly of claim 2 wherein said hook additionally includes a pair of barbs extending inwardly from said body portion, said barbs being adapted to penetrate the associated workpiece to thereby enhance the security of engagement of said hook thereon.

4. The assembly of claim 3 wherein the end of said body portion opposite to said one end has a notch formed therein defined by side edges which converge to a substantially rectilinear, transversely extending inner edge, said barbs being formed at the junctures of said side edges with said inner edge.

5. A tape rule device including a tape rule with an end assembly attached thereto, said end assembly comprising: a generally rectangular ring attached to the free end of said rule, and a hook, integrally formed from a single piece of material of uniform thickness, including a generally planar body portion having a substantially flat inner surface, and a hinge portion at one end thereof pivotably attached to the other end of said ring, said hinge portion being offset from said body portion a distance substantially equal to the thickness of said hook material and having a substantially flat outer surface extending thereacross, and comprising a centrally disposed neck element inwardly curved to a generally cylindrical configuration, and a pair of shoulder elements disposed to either side of said neck element and providing abutment surfaces on said hook, said neck element encircling said other end of said ring to permit said hook to pivot thereabout between a closed position wherein said body portion abuts the intermediate portion of said ring, and an open position wherein said body portion extends at a right angle to the plane thereof, said abutment surfaces of said shoulder elements bearing upon said ring in said open position to restrain movement of said hook beyond a perpendicular relationship thereto, and said inner surface of said body portion and said outer surface of said hinge portion being disposed in planes that are perpendicular to one another and perpendicularly equidistant from the axis of pivoting of said hook about said other end of said ring, whereby said inner surface and said outer surface will lie in the same imaginary plane, generally perpendicular to the plane of said ring, when said hook is in said open and closed positions thereof, respectively.

* * * * *